(12) United States Patent
Lee et al.

(10) Patent No.: US 10,732,406 B2
(45) Date of Patent: Aug. 4, 2020

(54) LENS STRUCTURE FORMED BY MATERIALS IN DIFFERENT REFRACTIVE INDEXES

(71) Applicant: CONCRAFT HOLDING CO., LTD., Grand Cayman (KY)

(72) Inventors: Chin-Hsing Lee, New Taipei (TW); Feng-Cheng Chung, New Taipei (TW); Jie-Ru Chen, New Taipei (TW)

(73) Assignee: CONCRAFT HOLDING CO., LTD., Grand Cayman (KY)

( * ) Notice: Subject to any disclaimer, the term of this patent is extended or adjusted under 35 U.S.C. 154(b) by 188 days.

(21) Appl. No.: 16/053,150

(22) Filed: Aug. 2, 2018

(65) Prior Publication Data
US 2019/0302450 A1 Oct. 3, 2019

(30) Foreign Application Priority Data
Apr. 3, 2018 (TW) ............... 107111719 A

(51) Int. Cl.
*G02B 27/00* (2006.01)
*G02B 13/00* (2006.01)
(Continued)

(52) U.S. Cl.
CPC ......... *G02B 27/0025* (2013.01); *G02B 5/005* (2013.01); *G02B 9/02* (2013.01);
(Continued)

(58) Field of Classification Search
CPC ........ G02B 3/00; G02B 13/06; G02B 15/177; G02B 27/0025; G02B 13/0045; G02B 13/005; G02B 13/04; G02B 6/32; G02B 13/16; G02B 1/041; G02B 3/02; G02B 13/006; G02B 23/243; G02B 13/009; G02B 13/08; G02B 13/18; G02B 15/142; G02B 15/20; G02B 21/02; G02B 3/0006;
(Continued)

(56) References Cited

U.S. PATENT DOCUMENTS 4,897,136 A * 1/1990 Bailey .................... G02B 5/128
156/145
6,288,842 B1 * 9/2001 Florczak ................ G02B 5/128
359/619
(Continued)

FOREIGN PATENT DOCUMENTS

TW I356760 B 1/2012

*Primary Examiner* — Collin X Beatty
*Assistant Examiner* — Grant A Gagnon
(74) *Attorney, Agent, or Firm* — Muncy, Geissler, Olds & Lowe, P.C.

(57) ABSTRACT

A lens structure formed by materials in different refractive indexes includes a sphere which is a round ball formed by a first portion and a second portion, a first lens which is formed on the first portion, a separation layer which is disposed between the sphere and the first lens, a second lens which is formed on the second portion, and a third lens which is formed on the second lens and opposite to the sphere. The first lens, the second lens and the third lens are formed respectively by a material in different refractive index and are provided respectively with a light absorption curve in different curvature, so that a light beam can pass through these light absorption curves to form plural times of light condensing effect.

10 Claims, 6 Drawing Sheets

(51) Int. Cl.
*G02B 5/00* (2006.01)
*G02B 9/02* (2006.01)
*G02B 7/02* (2006.01)

(52) U.S. Cl.
CPC ......... *G02B 13/005* (2013.01); *G02B 13/006* (2013.01); *G02B 7/027* (2013.01)

(58) Field of Classification Search
CPC .. G02B 3/0018; G02B 3/0031; G02B 3/0056; G02B 3/0068; G02B 3/04; G02B 5/005; G02B 5/208; G02B 9/60; G02B 9/64; G02B 13/001; G02B 13/0015; G02B 13/002; G02B 13/0055; G02B 13/14; G02B 13/24; G02B 15/14; G02B 15/15; G02B 15/16; G02B 15/163; G02B 19/0028; G02B 19/0061; G02B 1/11; G02B 1/118; G02B 2003/0093; G02B 21/33; G02B 23/2407; G02B 23/2492; G02B 3/0012; G02B 3/06; G02B 3/12; G02B 3/14; G02B 6/2746; G02B 6/2937; G02B 6/327; G02B 6/3853; G02B 6/4204; G02B 6/4206; G02B 6/4212; G02B 7/02; G02B 7/021; G02B 7/027; G02B 7/028; G02B 9/04; G02B 9/06; G02B 9/10; G02B 13/00; G02B 13/0025; G02B 13/003; G02B 13/0035; G02B 13/0075; G02B 13/0095; G02B 15/155; G02B 15/167; G02B 15/17; G02B 15/173; G02B 15/22; G02B 15/24; G02B 15/28; G02B 17/08; G02B 17/0816; G02B 17/0852; G02B 17/086; G02B 17/0896; G02B 19/0014; G02B 19/0071; G02B 19/0076; G02B 1/00; G02B 1/005; G02B 1/02; G02B 1/10; G02B 1/12; G02B 2027/0127; G02B 2027/0132; G02B 2027/015; G02B 2027/0152; G02B 2027/0159; G02B 2027/0161; G02B 21/0008; G02B 21/0072; G02B 2207/121; G02B 2207/123; G02B 23/2461; G02B 23/2476; G02B 23/2484; G02B 26/004; G02B 26/10; G02B 27/0172; G02B 27/0176; G02B 27/0179; G02B 27/09; G02B 27/0927; G02B 27/0955; G02B 27/0961; G02B 27/0994; G02B 27/40; G02B 27/56; G02B 27/58; G02B 27/646; G02B 3/0025; G02B 3/0037; G02B 3/0062; G02B 3/08; G02B 5/003; G02B 5/045; G02B 5/10; G02B 5/20; G02B 5/205; G02B 5/22; G02B 5/285; G02B 6/0006; G02B 6/001; G02B 6/06; G02B 6/12; G02B 6/29389; G02B 6/322; G02B 6/3604; G02B 6/3818; G02B 6/3838; G02B 6/3882; G02B 6/3885; G02B 6/4201; G02B 6/4207; G02B 6/4232; G02B 6/4239; G02B 6/424; G02B 6/4253; G02B 6/4255; G02B 6/4256; G02B 6/4257; G02B 6/4263; G02B 6/4267; G02B 6/4292; G02B 7/026; G02B 7/04; G02B 7/08; G02B 7/10; G02B 7/12; G02B 7/24; G02B 9/62
USPC ........................................................ 359/664
See application file for complete search history.

(56) References Cited

U.S. PATENT DOCUMENTS

| | | | |
|---|---|---|---|
| 6,841,096 B2 * | 1/2005 | Quake | B01L 3/502715 264/2.5 |
| 7,170,688 B2 * | 1/2007 | Handerek | C03C 12/02 359/652 |
| 9,304,280 B2 * | 4/2016 | Gulari | G02B 7/027 |
| 2006/0226560 A1 | 10/2006 | Yu | |

* cited by examiner

LENS STRUCTURE FORMED BY MATERIALS IN DIFFERENT REFRACTIVE INDEXES

BACKGROUND OF THE INVENTION a) Field of the Invention

The present invention relates to a lens structure, and more particularly to a lens structure which is provided with high coaxiality and is formed by materials in different refractive indexes.

b) Description of the Prior Art

The optical lens has been developed gradually from a single lens to a multi-layered lens, in order to satisfy the specific request for light propagation. The multi-layered lenses are utilized to change the optical path, so as to eliminate the optical aberration and the spherical aberration. However, this needs to assemble each lens on a lens holder sequentially and therefore it will be more tedious in assembling and will also waste more space. In addition, to assemble the multi-layered lens, each lens should have high coaxiality to avoid the deviation in the optical axis.

To improve the aforementioned problems, a Taiwanese Invention Patent 1356760 has disclosed a superimposed lens and manufacturing method and device thereof, including an optical axis, more than one base material and more than one optical heat-resistant colloid layer. Each optical heat-resistant colloid layer includes a colloid layer optically effective circumference, and the axis of the optically effective circumference is superimposed with the optical axis. A center part of each base material includes a base material optically effective circumference. When the surface of the optically effective circumference is attached on the optical heat-resistant colloid layer, the axis of the base material optically effective circumference will be superimposed with the axis of the colloid layer optically effective circumference. The optical heat-resistant colloid layer is first titrated on a mold, and then the base material is attached to the optical heat-resistant colloid layer.

Furthermore, a US Patent Publication No. 20060226560 has disclosed a method for manufacturing a composite lens. First, a base-layer-forming material, a composite-layer-forming material, a base-layer-forming stamper and a composite-layer-forming stamper are provided. Each of the forming stampers is provided with a forming surface. Next, the base-layer-forming stamper is used to emboss the mounting-type surface on the base-layer-forming material, forming a base layer of the composite lens. Then, the composite-layer-forming stamper is used to emboss the forming surface thereof on the composite-layer-forming material and emboss the composite-layer-forming material on the base layer of the composite lens, forming a composite layer of the composite lens.

Accordingly, the composite lens is used to replace the assembly of multi-layered lens, so as to satisfy the requirement of high coaxiality. However, in forming the aforementioned composite lens, the steps are tedious, and it will also need various adhesive materials to increase the adhesive force among the lenses to avoid ablation among the lenses.

Therefore, the technical means and the object thereof to be solved by the present invention are the provision of a lens structure with high coaxiality to replace the multi-layered lens.

SUMMARY OF THE INVENTION

The primary object of the present invention is to provide a lens structure which is provided with high coaxiality and is formed by materials in different refractive indexes.

To achieve the aforementioned object, the present invention discloses a lens structure which is formed by materials in different refractive indexes, comprising a sphere, a first lens, a separation layer, a 20 second lens and a third lens. The sphere is transparent and is provided with a first refractive index. In addition, the sphere is a round ball formed by a first portion and a second portion which is connected with the first portion. The first lens is transparent and is provided with a second refractive index which is different from the first refractive index of the sphere. Furthermore, the first lens is formed on the first portion of the sphere, and is provided with a first light absorption curve opposite to the first portion of the sphere. The separation layer is disposed between the first portion of the sphere and the first lens, and is provided with a transparent section opposite to the first light absorption curve and a non-transparent section formed at a periphery of the transparent section. The second lens is transparent and is provided with a third refractive index which is different from the first refractive index of the sphere. Moreover, the second lens is formed on the second portion of the sphere and is opposite to the first lens, allowing the sphere and the separation layer to be enclosed between the first lens and the second lens. In addition, the second lens is provided with a second light absorption curve which is separated from the second portion of the sphere. The third lens is transparent and is provided with a fourth refractive index which is different from the third refractive index of the second lens. The third lens is formed on the second lens and is opposite to the sphere. In addition, the third lens is provided with a third light absorption curve which is separated from the second light absorption curve. Therefore, after passing through the third light absorption curve to form a first light condensing effect and then enter the third lens, a light beam will pass through the second light absorption curve to form a second light condensing effect and enter the second lens. Next, the light beam will pass through the second portion to form a third light condensing effect and enter the sphere. Finally, the light beam will pass through the transparent section to enter the first lens and then pass through the first light absorption curve to form a fourth light condensing effect.

In an embodiment, the lens structure further includes a fourth lens. The fourth lens is transparent and is provided with a fifth refractive index which is different from the first refractive index, and is disposed on the first lens opposite to the sphere. In addition, the fourth lens is provided with a fourth light absorption curve which is separated from the first light absorption curve, allowing the light beam that passes through the first light absorption curve to pass through the fourth light absorption curve to form a fifth light condensing effect.

In an embodiment, the sphere is a glass ball, and the first lens and the second lens are formed respectively on the first portion and the second portion of the sphere by injection molding to transparent silica gel; whereas, the third lens and the fourth lens are formed respectively on the first lens and the second lens by injection molding to transparent plastic, and the separation layer is not transparent.

In an embodiment, the first lens, the second lens, the third lens and the fourth lens constitute a cylinder.

In an embodiment, the first light absorption curve and the fourth light absorption curve constitute respectively a concave lens, whereas the second light absorption curve and the third light absorption curve constitute respectively a convex lens.

In an embodiment, the curvature of the first light absorption curve is larger than that of the fourth light absorption curve, and the curvature of the third light absorption curve is larger than that of the second light absorption curve.

In an embodiment, the third lens is further provided with a first attaching surface which is attached with the second light absorption curve of the second lens, and the fourth lens is further provided with a second attaching surface which is attached with the first light absorption curve of the first lens.

In an embodiment, the first lens is further provided with a first embedding slot opposite to the first light absorption curve, and the separation layer and the first portion of the sphere are disposed in the first embedding slot orderly.

In an embodiment, the second lens is further provided with a second embedding slot for disposing the second portion of the sphere, and the second embedding slot is separated from the second light absorption curve.

In an embodiment, the separation layer is further provided with an extension section which is annularly disposed outside the non-transparent section, and the extension section is extended between the first lens and the second lens.

In comparison to the prior arts, the lens structure formed by materials in different refractive indexes, according to the present invention, is provided with following advantages:
1. In the present invention, the lens structure formed by materials in different refractive indexes can replace the conventional multi-layered lens, so as to satisfy the request of high coaxiality and achieve the effect of reducing the space.
2. In the present invention, the sphere in a shape of a round glass ball is used, allowing the entire sphere to form a spherical surface to increase significantly the range of lighting, solve effectively the problem of stray light and increase the light absorption efficiency, thereby reducing the imaging dark region, and solving the problems of astigmatism and optical aberration to improve the imaging quality.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
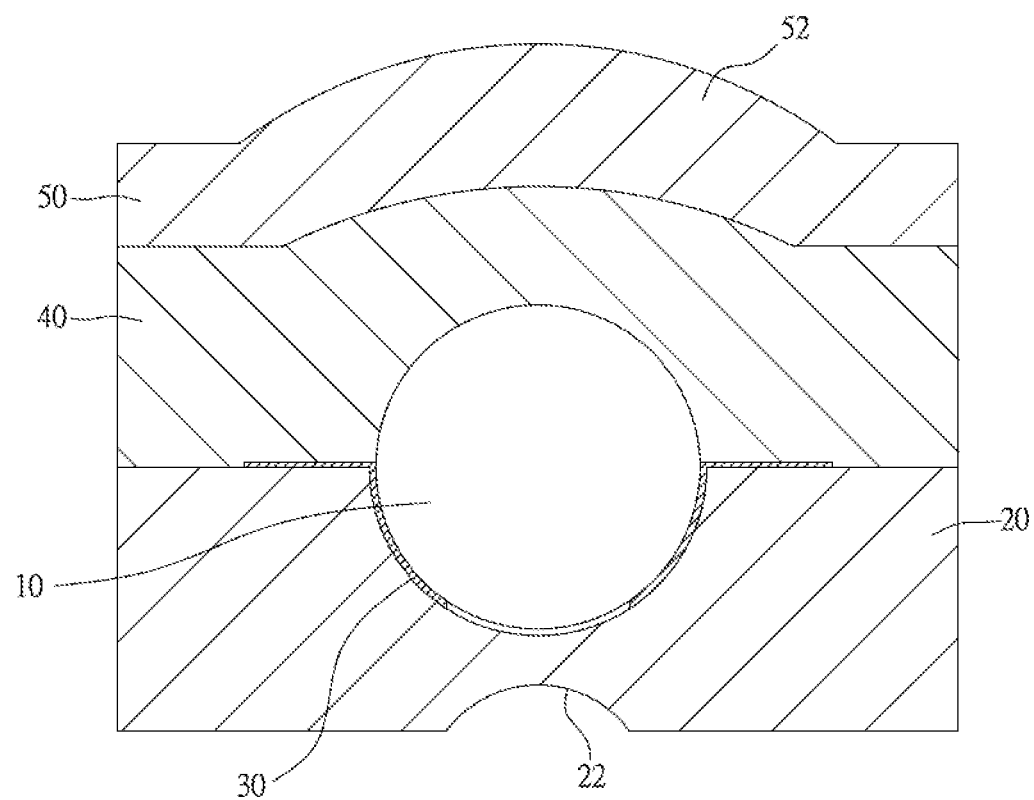
FIG. 1 shows a cutaway view of a first embodiment of the present invention.
Figure 2:
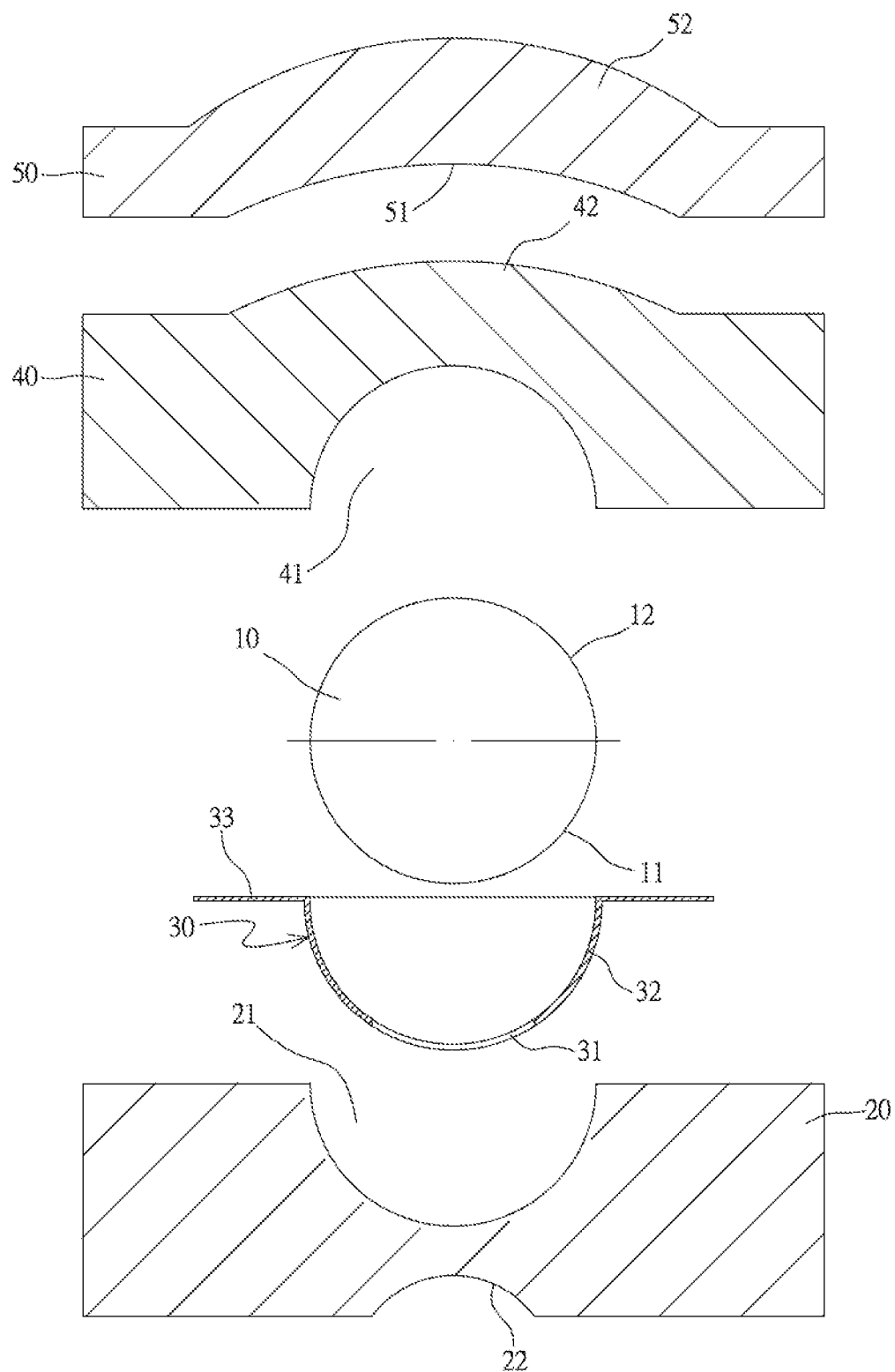
FIG. 2 shows an exploded view of the first embodiment of the present invention.

Referring to FIG. 1 and FIG. 2, it shows a first embodiment provided by the present invention which discloses a lens structure formed by materials in different refractive indexes. The lens structure comprises a sphere 10, a first lens 20, a separation layer 30, a second lens 40 and a third lens 50.

Specifically, the sphere 10 is provided with a first portion 11 and a second portion 12 which is connected with the first portion 11 to become an integrated unit. The first portion 11 and the second portion 12 constitute a transparent round ball and the sphere 10 is provided with a first refractive index.

The first lens 20 is formed on a side of the sphere 10, and a first embedding slot 21 is disposed on the first lens 20 in adjacent to the first portion 11 of the sphere 10 to embed the first portion 11, allowing the first portion 11 to be embedded into the first embedding slot 21, so that the second portion 12 of the sphere 10 can be exposed out of the first lens 20 to form a convex lens on the first lens 20. On the other hand, a first light absorption curve 22 is disposed on the first lens 20 opposite to the other side of the sphere 10, and the first light absorption curve 22 is a concave lens. The first lens 20 is transparent too and is provided with a second refractive index which is different from the first refractive index of the sphere 10.

The separation layer 30 is not transparent and is disposed between the first portion 11 of the sphere 10 and the first embedding slot 21 of the first lens 20. The separation layer 30 is provided with a transparent section 31 opposite to the first light absorption curve 22, a non-transparent section 32 formed at a periphery of the transparent section 31, and an extension section 33 formed outside the non-transparent section 32. The transparent section 31 is a through-hole, and the non-transparent section 32 is annularly disposed on the periphery of the transparent section 31.

The second lens 40 is disposed on the second portion 12 of the sphere 10 and is opposite to the first lens 20, allowing the sphere 10 and the separation layer 30 to be enclosed between the first lens 20 and the second lens 40. On the other hand, the second lens 40 is provided with a second embedding slot 41 on a surface in adjacent to the first lens 20. The second embedding slot 41 is opposite to the first embedding slot 21 of the first lens 20 and is used to embed the second portion 12 of the sphere 10. In addition, the second lens 40 is formed with a second light absorption curve 42 on the other surface away from the first lens 20. The second light absorption curve 42 is a convex lens and is separated from the second portion 12 of the sphere 10. The second lens 40 is also transparent and is provided with a third refractive index which is different from the first refractive index of the sphere 10. On the other hand, the extension section 33 of the separation layer 30 is clipped between the first lens 20 and the second lens 40.

The third lens 50 is formed on the second lens 40 and is opposite to the sphere 10. The third lens 50 is provided with a first attaching surface 51 on a surface in adjacent to the second lens 40 to attach with the second light absorption curve 42 of the second lens 40, so that the third lens 50 can be attached completely with the second lens 40. The third lens 50 is formed with a third light absorption curve 52 on the other surface away from the second lens 40; whereas, the third light absorption curve 52 is a convex lens and is separated from the second light absorption curve 42 of the second lens 40. The third lens 50 is also transparent and is provided with a fourth refractive index which is different from the third refractive index of the second lens 40.

In the present embodiment, the sphere 10 is a glass ball, allowing the whole circumference of the sphere 10 to form a spherical surface. On the other hand, the first lens 20 and the second lens 40 are formed orderly on the first portion 11 and the second portion 12 of the sphere 10 by injection molding to transparent silica gel, so that the second refractive index of the first lens 20 can be the same as the third refractive index of the second lens 40. As the transparent silica gel is transparent and highly adhesive, the first lens 20 and the second lens 40 can be attached effectively with the sphere 10 and the separation layer 30. On the other hand, the third lens 50 is formed on the second lens 40 by injection molding to transparent plastic, allowing the fourth refractive index of the third lens 50 to be different from the third refractive index of the second lens 40. In addition, the sphere 10, the first light absorption curve 22, the second light absorption curve 42, the third light absorption curve 52 and the transparent section 31 are disposed on a same axis, and the curvature of the third light absorption curve 52 is larger than that of the second light absorption curve 42. Besides that, in the present embodiment, the first lens 20, the second lens 40 and the third lens 50 constitute a cylinder.

Figure 3:
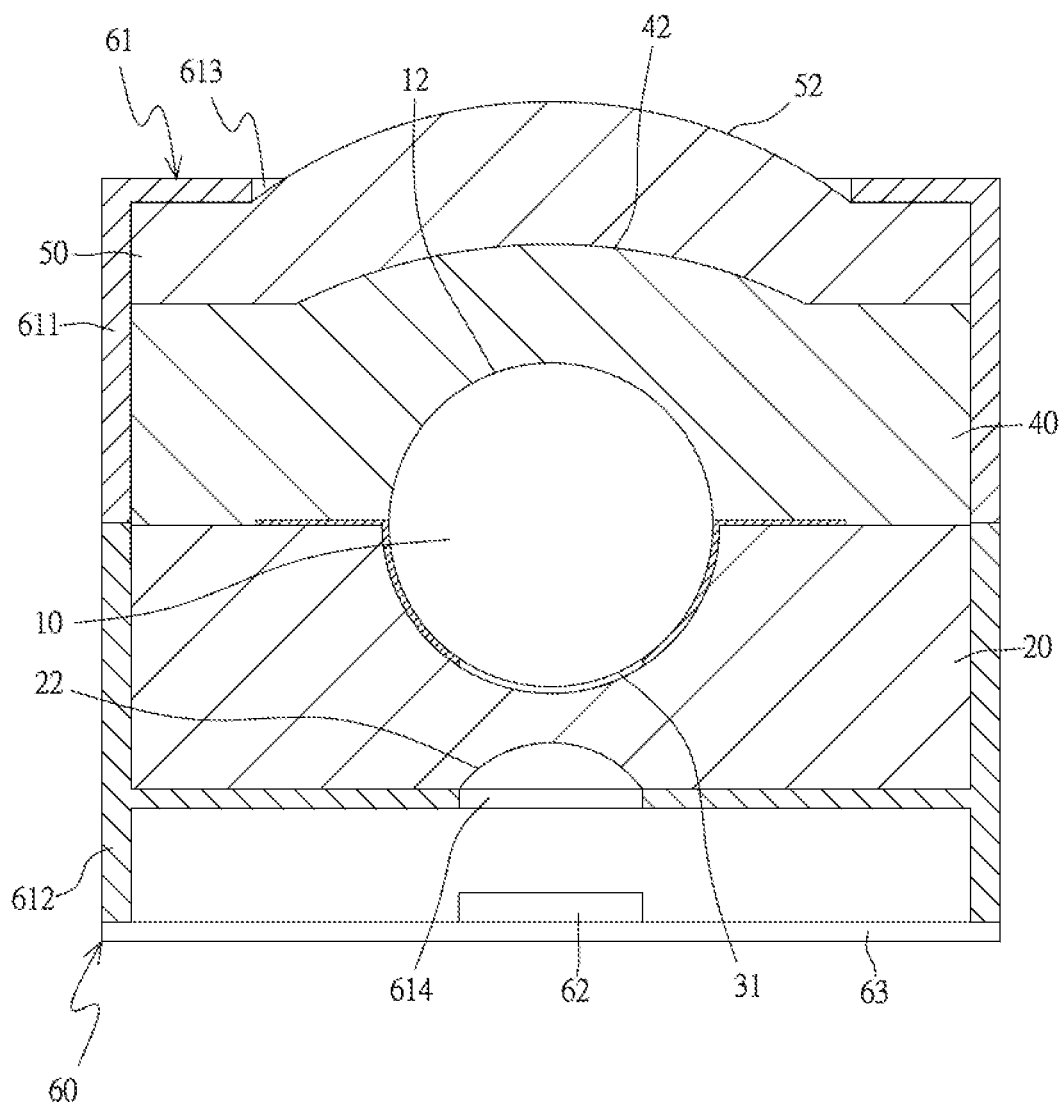
FIG. 3 shows a cutaway view of the first embodiment of the present invention which is applied to a photography module.

Referring to FIG. 2 and FIG. 3, the first embodiment of the present invention is applied to a photography module 60. The photography module 60 includes a lens base 61, an image sensing module 62 and a circuit board 63. The lens base 61 includes a first base 611 and a second base 612 which is assembled on the first base 611. A collecting space is formed between the first base 611 and the second base 612, so that the first lens 20, the second lens 40 and the third lens 50 that constitute the cylinder can be directly disposed in the collecting space. Therefore, the first lens 20, the second lens 40 and the third lens 50 that constitute the cylinder can be quickly assembled in the lens base 61. On the other hand, the first base 611 is provided with an incident hole 613 for transfixing the third light absorption curve 52 of the third lens 50, so that the third light absorption curve 52 can be exposed out of the first base 611 through the incident hole 613. The second base 612 is provided with a receiving hole 614 in adjacent to the first light absorption curve 22, and the image sensing module 62 is disposed below the receiving hole 614 and is connected electrically on the circuit board 63.

Accordingly, as the third light absorption curve 52 of the third lens 50 is a convex lens and is exposed out of the lens base 61, when a light beam passes through the third light absorption curve 52 from an exterior side of the lens base 61, the range of lighting outside the lens base 61 can be increased by the third light absorption curve 52. In addition, after passing through the third light absorption curve 52 to form a first light condensing effect, the light beam will enter the third lens 50, and then the light beam that enters the third lens 50 will pass through the second light absorption curve 42 on the second lens 40 to enter the second lens 40. After passing through the second light absorption curve 42, the light beam will form a second light condensing effect. Next, the light beam will pass through the second portion 12 of the sphere 10 to enter the sphere 10, forming a third light condensing effect after passing through the second portion 12. Then, the light beam will pass through the transparent section 31 of the separation layer 30 to enter the first lens 20, forming a fourth light condensing effect after passing through the first light absorption curve 22 of the first lens 20. Finally, the light beam that forms the fourth light condensing effect will pass through the receiving hole 614 to enter the image sensing module 62, which is able to solve effectively the problem of stray light, increase the light absorption efficiency, reduce the imaging dark region, and improve the imaging quality.

Moreover, as the first lens 20, the second lens 40 and the third lens 50 are formed orderly on the sphere 10 by injection molding, the coaxiality among the sphere 10, the first lens 20, the separation layer 30, the second lens 40 and the third lens 50 can be controlled effectively, thereby satisfying the request of high coaxiality for the multi-layered lens. In addition, as the first lens 20, the second lens 40 and the third lens 50 are formed orderly on the sphere 10 by injection molding, the volumes of the first lens 20, the second lens 40 and the third lens 50 can be controlled effectively, thereby reducing effectively the volume of the photography module 60 to achieve the effect of reducing the space of the photography module 60.

Figure 4:
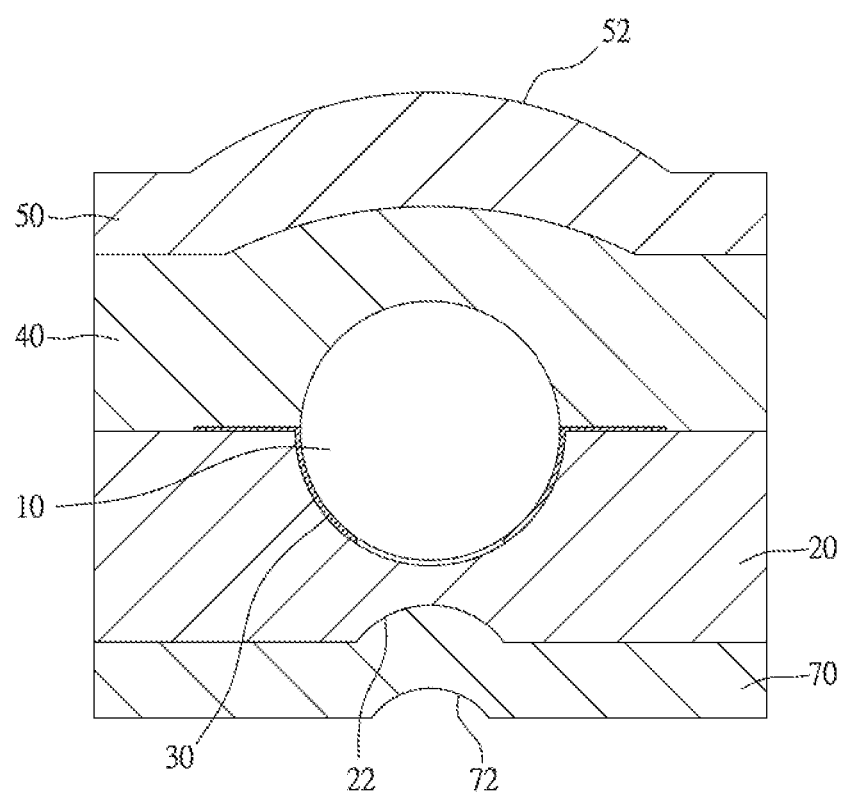
FIG. 4 shows a cutaway view of a second embodiment of the present invention.
Figure 5:
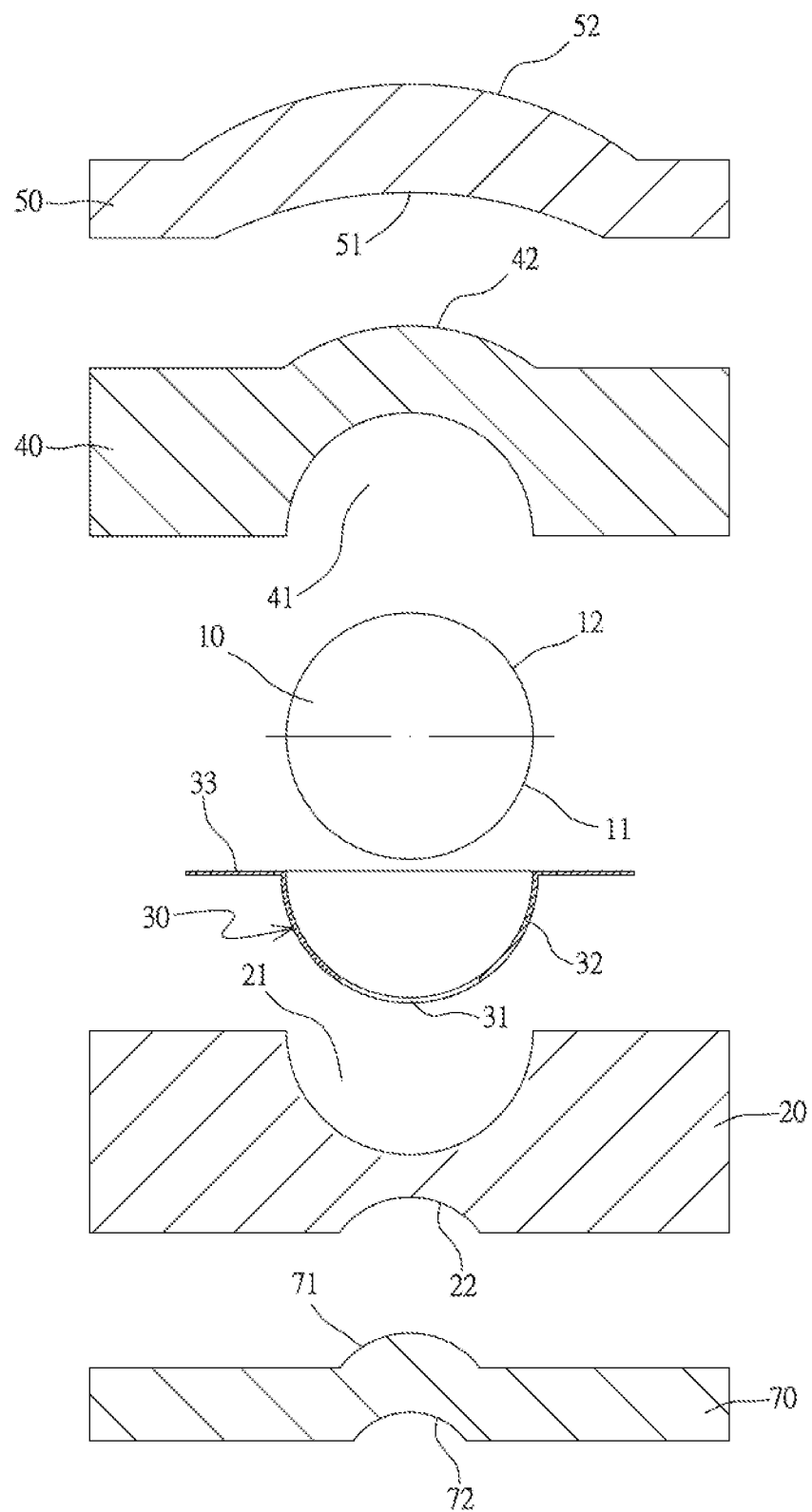
FIG. 5 shows an exploded view of the second embodiment of the present invention.

Referring to FIG. 4 and FIG. 5, it shows a second embodiment of the present invention. In the present embodiment, the lens structure is formed by the sphere 10, the first lens 20, the separation layer 30, the second lens 40, the third lens 50 and a fourth lens 70. The fourth lens 70 is disposed on the first lens 20 and is opposite to the sphere 10. The fourth lens 70 is provided with a second attaching surface 71 on a surface in adjacent to the first lens 20 to attach with the first light absorption curve 22 of the first lens 20, so that the fourth lens 70 can be attached with the first lens 20. On the other hand, the fourth lens 70 is formed with a fourth light absorption curve 72 on the other surface away from the first lens 20, the fourth light absorption curve 72 and the first light absorption curve 22 are all a concave lens, and the fourth light absorption curve 72 is separated from the first light absorption curve 22.

In the present embodiment, the fourth lens 70 and the third lens 50 are formed respectively on the first lens 20 and the second lens 40 by injection molding to transparent plastic, so that the sphere 10, the first light absorption curve 22, the second light absorption curve 42, the third light absorption curve 52, the fourth light absorption curve 72 and the transparent section 31 can be disposed on a same axis. In addition, the curvature of the first light absorption curve 22 is larger than that of the fourth light absorption curve 72, and the curvature of the third light absorption curve 52 is larger than that of the second light absorption curve 42. Besides that, the first lens 20, the second lens 40, the third lens 50 and the fourth lens 70 constitute a cylinder in the present embodiment.

Figure 6:
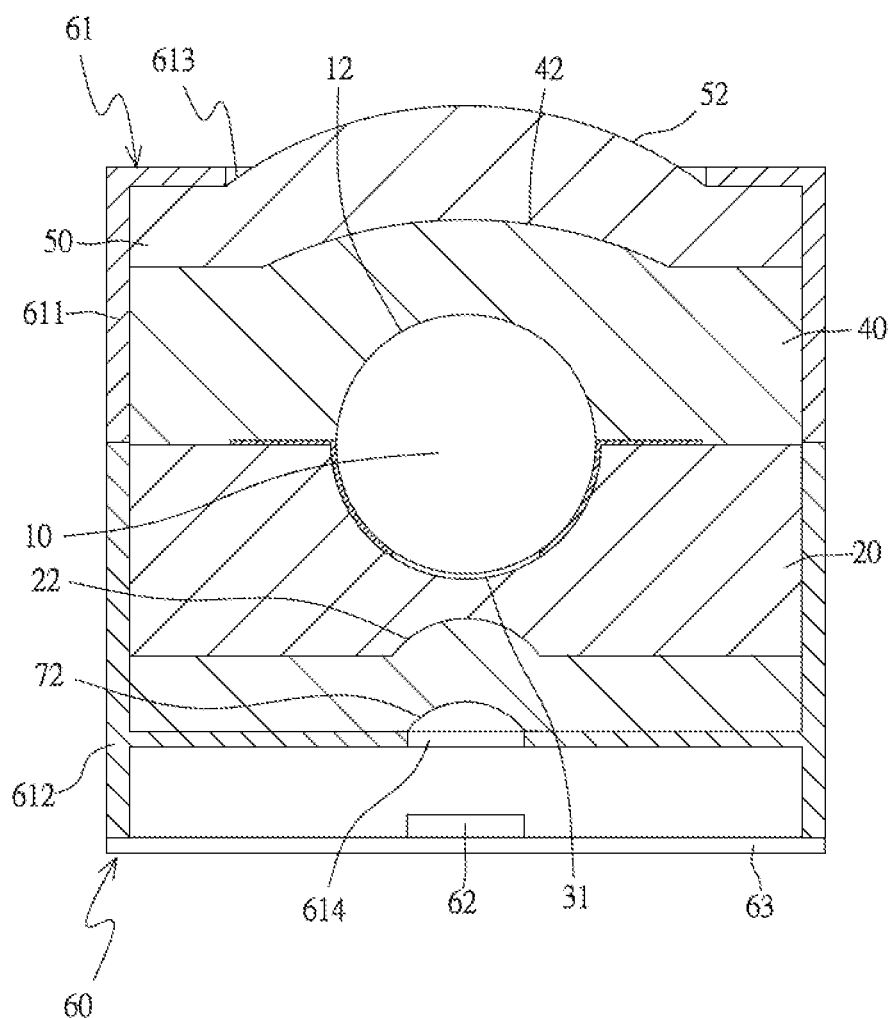
FIG. 6 shows a cutaway view of the second embodiment of the present invention which is applied to the photography module.

Referring to FIG. 5 and FIG. 6, when the second embodiment of the present invention is applied to the photography module 60, the first lens 20, the second lens 40, the third lens 50 and the fourth lens 70 that constitute the cylinder are installed in the lens base 61, allowing the third light absorption curve 52 of the third lens 50 to be exposed out of the lens base 61 through the incident hole 613; whereas, the fourth light absorption curve 72 of the fourth lens 70 is in adjacent to the receiving hole 614, allowing the fourth light absorption curve 72 to be in adjacent to the image sensing module 62. When a light beam passes through the third light absorption curve 52 from an exterior side of the lens base 61, a first light condensing effect will be formed, enabling the light beam to enter the third lens 50. Next, the light beam will pass through the second light absorption curve 42 to form a second light condensing effect, followed by entering the second lens 40. After entering the second lens 40, the light beam will pass through the second portion 12 of the sphere 10 to form a third light condensing effect, followed by entering the sphere 10. After entering the sphere 10, the light beam will pass through the sphere 10 to enter the first lens 20, followed by passing through the first light absorption curve 22 to form a fourth light condensing effect and enter the fourth lens 70. Finally, the light beam will form a fifth light condensing effect through the fourth light absorption curve 72, and then enter the image sensing module 62 after passing through the receiving hole 614. Accordingly, it can similarly solve the problem of stray light effectively, increase the light absorption efficiency, reduce the imaging dark region, and solve the problems of astigmatism and optical aberration, thereby improving the imaging quality.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A lens structure formed by materials in different refractive indexes, comprising a sphere, a first lens, a separation layer, a second lens and a third lens, wherein the sphere is transparent, is provided with a first refractive index, and is a round ball formed by a first portion and a second portion which is connected with the first portion; the first lens is transparent and is provided with a second refractive index which is different from the first refractive index of the sphere, with that the first lens is formed on the first portion of the sphere and is provided with a first light absorption curve opposite to the first portion of the sphere; the separation layer is disposed between the first portion of the sphere and the first lens, and is provided with a transparent section opposite to the first light absorption curve and a non-transparent section formed at a periphery of the transparent section; the second lens is transparent and is provided with a third refractive index which is different from the first refractive index of the sphere, with that the second lens is formed on the second portion of the sphere and is opposite to the first lens that the sphere and the separation layer are enclosed between the first lens and the second lens, and the second lens is provided with a second light absorption curve which is separated from the second portion of the sphere; and the third lens is transparent and is provided with a fourth refractive index which is different from the third refractive index of the second lens, with that the third lens is formed on the second lens and is opposite to the sphere, and the third lens is provided with a third light absorption curve which is separated from the second light absorption curve, such that when a light beam passes through the third light absorption curve to form a first light condensing effect and then enter the third lens, the light beam passes through the second light absorption curve to form a second light condensing effect and enter the second lens, next the light beam passes through the second portion to form a third light condensing effect and enter the sphere, and finally the light beam passes through the transparent section to enter the first lens, followed by passing through the first light absorption curve to form a fourth light condensing effect.

2. The lens structure formed by materials in different refractive indexes, according to claim 1, wherein the first lens is further provided with a first embedding slot opposite to the first light absorption curve, and the separation layer and the first portion of the sphere are disposed in the first embedding slot orderly.

3. The lens structure formed by materials in different refractive indexes, according to claim 1, wherein the second lens is further provided with a second embedding slot for disposing the second portion of the sphere, and the second embedding slot is separated from the second light absorption curve.

4. The lens structure formed by materials in different refractive indexes, according to claim 1, wherein the separation layer is further provided with an extension section which is annularly disposed outside the non-transparent section, and the extension section is extended between the first lens and the second lens.

5. The lens structure formed by materials in different refractive indexes, according to claim 1, further comprising a fourth lens, wherein the fourth lens is transparent and is provided with a fifth refractive index which is different from the first refractive index, with that the fourth lens is disposed on the first lens and is opposite to the sphere, and the fourth lens is provided with a fourth light absorption curve which is separated from the first light absorption curve, allowing the light beam that passes through the first light absorption curve to pass through the fourth light absorption curve, forming a fifth light condensing effect.

6. The lens structure formed by materials in different refractive indexes, according to claim 5, wherein the sphere is a glass ball, the first lens and the second lens are formed respectively on the first portion and the second portion of the sphere by injection molding to transparent silica gel, the third lens and the fourth lens are formed respectively on the first lens and the second lens by injection molding to transparent plastic, and the separation layer is not transparent.

7. The lens structure formed by materials in different refractive indexes, according to claim 5, wherein the first lens, the second lens, the third lens and the fourth lens constitute a cylinder.

8. The lens structure formed by materials in different refractive indexes, according to claim 5, wherein the first light absorption curve and the fourth light absorption curve are formed respectively with a concave lens, and the second light absorption curve and the third light absorption curve are formed respectively with a convex lens.

9. The lens structure formed by materials in different refractive indexes, according to claim 8, wherein the curvature of the first light absorption curve is larger than that of the fourth light absorption curve, and the curvature of the third light absorption curve is larger than that of the second light absorption curve.

10. The lens structure formed by materials in different refractive indexes, according to claim 8, wherein the third lens is further provided with a first attaching surface which is attached with the second light absorption curve of the second lens, and the fourth lens is further provided with a second attaching surface which is attached with the first light absorption curve of the first lens.

* * * * *